United States Patent Office.

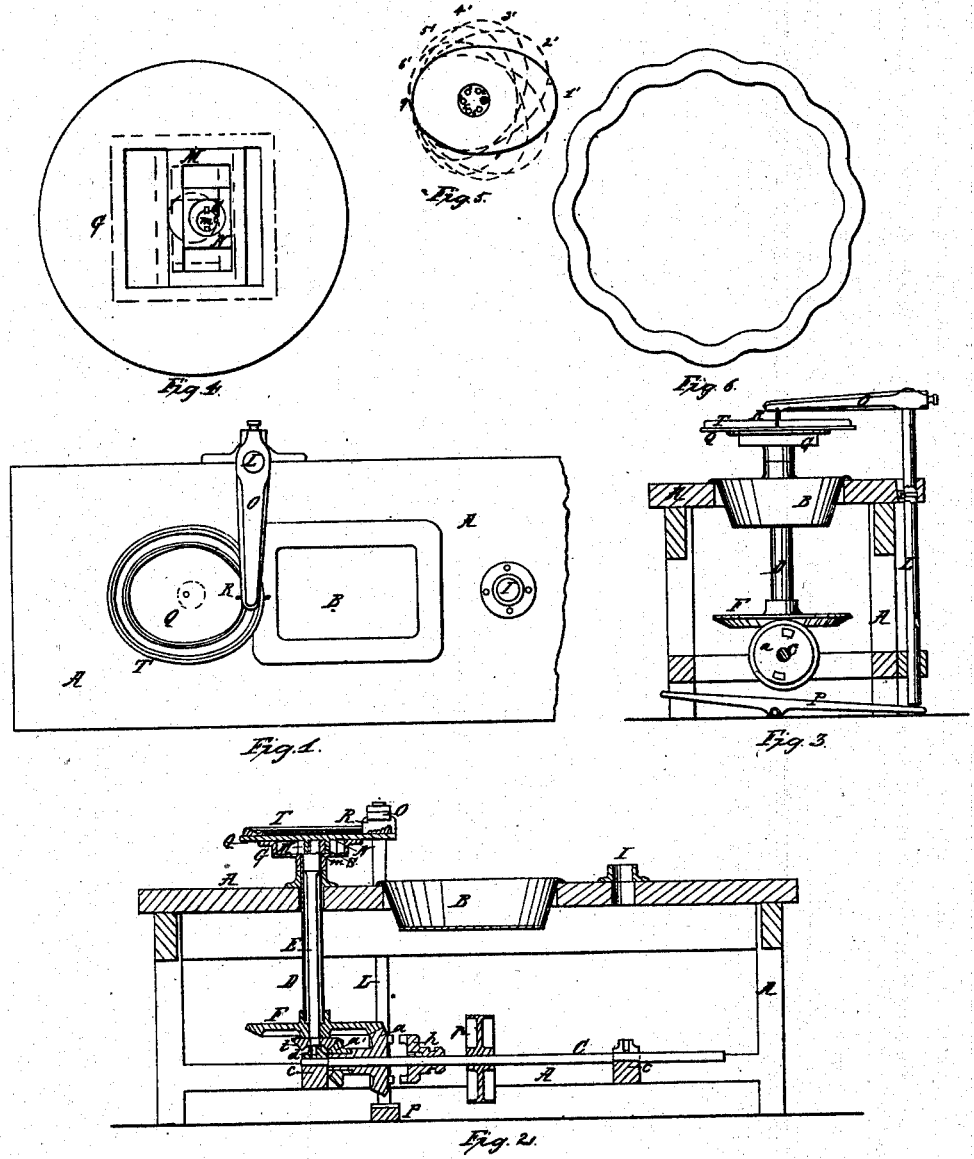

JOHN E. SWEET, OF SYRACUSE, NEW YORK, ASSIGNOR TO JOHN T. BON AND E. R. SANFORD, OF SAME PLACE.

*Letters Patent No. 62,086, dated February 12, 1867.*

IMPROVEMENT IN MACHINERY FOR MAKING OVAL PICTURE-FRAMES.

*The Schedule referred to in these Letters Patent and making part of the same.*

KNOW ALL MEN BY THESE PRESENTS:

That I, JOHN E. SWEET, of the city of Syracuse, county of Onondaga, and State of New York, have invented certain new and useful Improvements in Machinery used for Manufacturing Oval Picture-Frames; and I do hereby declare the following to be a sufficiently clear and exact description of the same that any one skilled in such matters may, in connection with the accompanying drawings, which form a part of my specifications, readily construct and use my invention.

I may premise, however, the remark that all such frames are at present made of wood, and have their faces, or that portion which is to be neatly finished, left in a rough condition, but with the true form, after which a composition of a plastic nature is laid over said faces or surfaces in several successive layers, and worked into a proper shape by a "former," until a nice hard surface is obtained, upon which the gilding or pigments may be laid. Now the chief object of my invention is to facilitate the laying on of this plastic composition by mechanism which is completely automatic with the single exception of supplying the material to the frame.

Figure 1 is a plan or top view.
Figure 2, a longitudinal and vertical section.
Figure 3, a transverse vertical section.
Figure 4, an enlarged plan of the eccentric movement.
Figure 5, a diagram showing six different positions of the frame during a half revolution.
Figure 6, an outline of a waved circle, which may be produced by a simple change of the gearing.

Like letters refer to like parts in all the figures.

A is the frame or table, made of wood or other suitable material, longitudinal in form, with a basin, B, in the centre, so situated that two operatives can be easily supplied from it. The driving-shaft C, supported in the bearings $c$ $c$, receives its motion from the driving pulley, $p$. Upon it is a clutch, $h$, and two pinions, $a$ and $a'$. D and E are two shafts, one within the other, as shown in fig. 2. The outer shaft D is secured at its lower end in the bevel-wheel F, and at its upper end carries a metal box, G, figs. 2 and 3. The inner shaft E has its bearing in the step $d$, and upon its lower end the mitre pinion $t$, and at its upper end a crank or eccentric, $m$, as seen in figs. 2 and 4. Upon the crank $m$, as shown at fig. 4, is an adjustable eccentric-sleeve, S, which gives the capacity of increasing or diminishing the "throw" of the crank $m$. M is a parallelogram-shaped box, whose extreme length is equal to the size of the inside of box G, and fitted so as to slide freely therein. N is a box of similar form within the box M, and similarly fitted, and within it is nicely adjusted the crank $m$ or sleeve S, all so arranged that the box N can move in any direction parallel with the plane of motion, and will revolve only when the box G is in motion. The arm O, upon the upper end of the upright rod L, whose lower end rests upon the pedal P, figs. 2 and 3, supports the scraper or "former" R, which is made of metal, and is cut to suit the face of the frame, as shown at $z$, fig. 2. The arm O is made adjustable upon the upright by a set-screw, as shown at fig. 3, so as to be adapted to the various thicknesses of frame. At $r$, upon the upright L, is a stud or "feather" working in a slot so as to keep the arm O firmly fixed when in operation, but readily turned out of the way by placing the foot on the pedal so as to raise said stud from or above the slot. The frame T to be operated upon is secured upon a platen, 2, which is fastened upon the box G, and therefore revolves with it when the machine is in motion, and also receives all the movements that the combined pinions and crank would give to said box. Some of said movements may be more readily understood by a reference to fig. 5, where six different positions of the frame are shown in a half revolution; as, for example, let the black line represent the frame or oval, and the starting-point 1 the position of the common centre of the oval and also the centre of the eccentric; let the oval be revolved one-twelfth of a revolution and the eccentric one-sixth, and the position of the oval will be represented by the blue line. The red line would represent the position of the oval at another twelfth, or the crank, at 1 2 3 4 5 and 6, would place the corresponding points of the oval at 1' 2' 3' 4' 5' 6'. But at 9 all the lines coincide, and at this point a fixed scraper or former can be stationed. It will be observed that at I, figs. 1 and 2, similar machinery could be arranged, and two operatives could work at the same table, as already hinted. The plastic from the basin B is applied to the frame with a brush, and as the machinery revolves, the surface is scraped off by the former, as at R and $z$, fig. 2, or at the point 9 as shown in fig. 5.

Having thus briefly described my invention, what I desire to claim, and secure by Letters Patent, is—

1. The combination and arrangement of the shafts C D E, and their pinions, with the crank and its boxes, substantially as described and for the purposes set forth.

2. The eccentric-sleeve S, for varying the throw of the crank, substantially as described.

3. The combination of the scraper R, arm O, and upright L, either with or without the pedal P, as described and for the purposes set forth.

JOHN E. SWEET.

Witnesses:
WILLIAM A. SWEET,
WILLIAM W. COCK.